Oct. 13, 1925.
R. BIDDLE
SPINDLE LUBRICATOR
Filed Nov. 26, 1923
1,557,191
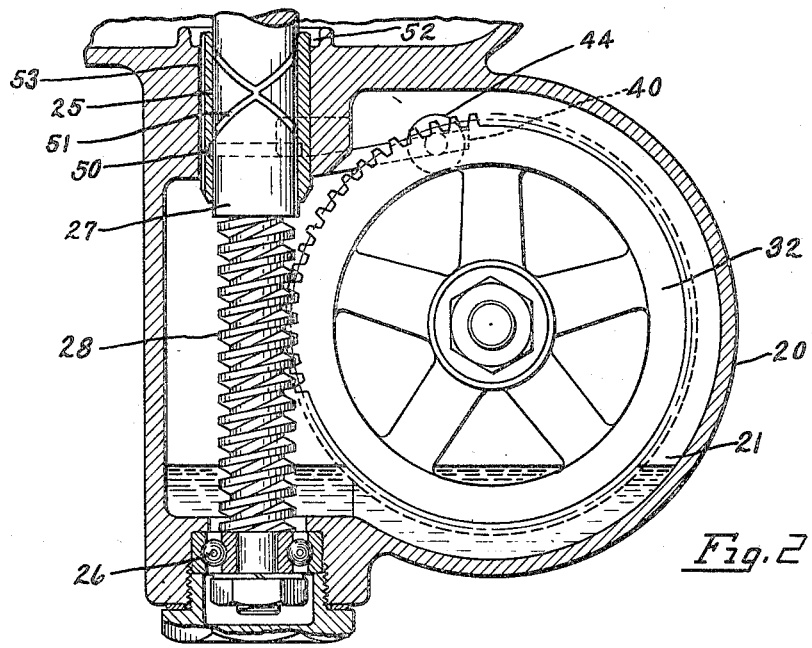
Fig. 2
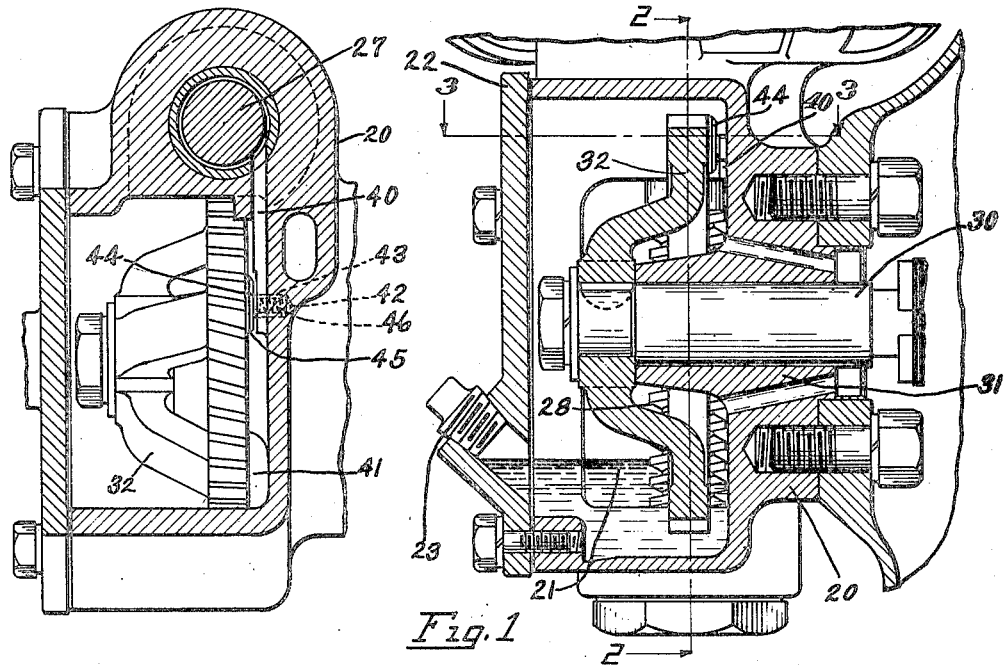
Fig. 3
Fig. 1
Inventor
Ross Biddle
By Spencer, Sewell & Hardman
His Attorneys Patented Oct. 13, 1925.

1,557,191

UNITED STATES PATENT OFFICE.

ROSS BIDDLE, OF DAYTON, OHIO, ASSIGNOR TO DELCO-LIGHT COMPANY, OF DAYTON, OHIO, A CORPORATION OF DELAWARE.

SPINDLE LUBRICATOR.

Application filed November 26, 1923. Serial No. 677,167.

*To all whom it may concern:*

Be it known that I, ROSS BIDDLE, a citizen of the United States of America, residing at Dayton, county of Montgomery, State of Ohio, have invented certain new and useful Improvements in Spindle Lubricators, of which the following is a full, clear, and exact description.

This invention relates to the lubrication of bearings and includes among its objects to supply lubricant to a bearing from a reservoir located at a substantial distance below the bearing.

An embodiment of one form of the invention for accomplishing this object includes a gear housing providing a lubricant reservoir and a plurality of shafts supported by the housing and connected by gearing. One of the shaft bearings is located substantially above the lubricant level in the housing and is supplied with lubricant through the agency of means which includes one of the gears connecting the two shafts.

Further objects and advantages of the present invention will be apparent from the following description, reference being had to the accompanying drawing, wherein a preferred embodiment of one form of the present invention is clearly shown.

In the drawing:

Fig. 1 is a sectional view of a gear housing and the gearing contained therein, showing the present invention applied thereto.

Fig. 2 is a sectional view taken on the line 2—2 of Fig. 1.

Fig. 3 is a sectional view taken on the line 3—3 of Fig. 1.

Referring to the drawings, a gear housing 20 provides a lubricant reservoir 21 and has a removable cover 22 which receives a filler plug 23 which may be removed when it is desired to place lubricant in the reservoir 21. Housing 20 supports bearings 25 and 26 in which a shaft 27 is journaled, bearing 25 being substantially above the lubricant level in the lubricant chamber 21. Shaft 27 may be driven by an electric motor or other prime mover (not shown).

Shaft 30, which is journaled in bearing 31 provided by gear housing 20, carries a worm gear 32 which is adapted to be rotated in lubricant in the reservoir 21 by worm 28 carried by shaft 27. Shaft 30 may be connected with any suitable work machine.

The means for lubricating the bearing 25, comprises an inclined shelf 40 which extends from adjacent the upper edge of gear 32, as viewed in Fig. 2, to an annular groove 50 on the inner surface of bearing 25. Adjacent the end of shelf 40 more remote from bearing 25, and opposite the front face 41 of gear 32, a drilled hole 42 is provided for loosely receiving shank 43 of a button or wiper 44 having a knife edge 45. Shank 43 is hollow and receives a coil spring 46, which bearing upon the bottom of hole 42 tends to resiliently maintain button 44 in engagement with the front face 41 of gear 32.

Spiral grooves 51 are provided in shaft 27 for carrying lubricant from groove 50 in bearing 25 up to the recess 52, from where the lubricant may drain back into the lubricant reservoir 21 through groove 53 in the outer surface of bearing 25.

*Mode of operation.*

Upon rotation of gear 32 by worm 28, lubricant will adhere to the face 41 of gear 32 and be carried thereby toward the shelf 40. The knife edge 45 of button 44 scraping against the front surface 41 of gear 32 will remove lubricant therefrom and permit the lubricant to flow upon the shelf 40. The shelf 40 being inclined toward the groove 50 in bearing 25, will cause the lubricant that has been removed from face 41 to flow down the shelf 40 into groove 50, and thereby furnish bearing 25 with lubricant. The supply of lubricant delivered to bearing 25 will vary in accordance with the speed of rotation of the gear 32 by shaft 27. At high speeds of rotation of shaft 27, there will be a greater demand for lubrication of bearing 25, and this demand will be supplied by the high speed of rotation of gear 32 in the lubricant. At lower speeds of shaft 27 and consequently of gear 32, when there is a smaller demand for lubricant upon the bearing 25, a lesser amount will be supplied by the slower rotation of gear 32 in the lubricant.

While the form of embodiment of the invention as herein disclosed, constitutes a preferred form, it is to be understood that other forms might be adopted, all coming within the scope of the claims which follow.

What is claimed is as follows:

1. A lubricating apparatus for bearings comprising, in combination with a bearing, a lubricant reservoir, a disc rotatable through said lubricant and having its rim located adjacent a wall of said reservoir, and a movable wiper supported by said wall and resiliently engaging a relatively small portion of the end face of the disc, and a duct provided by said wall for conducting to the bearing lubricant removed by the wiper.

2. Lubricating apparatus for bearing comprising, in combination with a bearing, a lubricant reservoir, a disc rotatable through said lubricant and having its rim located adjacent a wall of said reservoir, and a relatively small wiping element having a shank supported for endwise movement by said wall, a spring for urging the wiping element against the disc, and a duct provided by said wall for conducting to the bearing lubricant removed by the wiper.

In testimony whereof I hereto affix my signature.

ROSS BIDDLE.